US008996284B2

(12) United States Patent
Polimeno et al.

(10) Patent No.: US 8,996,284 B2
(45) Date of Patent: Mar. 31, 2015

(54) AUTOMOTIVE ELECTRICAL SYSTEM OPERATION MANAGEMENT DURING COASTING AND WITH ENGINE OFF

(75) Inventors: Alessandro Polimeno, Turin (IT); Giuseppe Delvino, Turin (IT)

(73) Assignee: FIAT Group Automobiles S.p.A., Torino (IT)

( * ) Notice: Subject to any disclaimer, the term of this patent is extended or adjusted under 35 U.S.C. 154(b) by 906 days.

(21) Appl. No.: 13/115,379

(22) Filed: May 25, 2011

(65) Prior Publication Data

US 2011/0320109 A1    Dec. 29, 2011

(30) Foreign Application Priority Data

May 25, 2010   (EP) .................................... 10425176

(51) Int. Cl.

| | | |
|---|---|---|
| F02N 11/08 | (2006.01) | |
| H02J 7/14 | (2006.01) | |
| B60L 3/00 | (2006.01) | |
| B60L 7/26 | (2006.01) | |
| B60L 11/14 | (2006.01) | |
| B60W 10/06 | (2006.01) | |
| B60W 10/26 | (2006.01) | |
| B60W 30/18 | (2012.01) | |
| B60W 30/192 | (2012.01) | |
| B60W 50/023 | (2012.01) | |
| G06F 7/00 | (2006.01) | |
| B60W 30/00 | (2006.01) | |
| B60R 16/02 | (2006.01) | |

(52) U.S. Cl.

CPC ............. *H02J 7/1423* (2013.01); *B60L 3/0092* (2013.01); *B60L 7/26* (2013.01); *B60L 11/14* (2013.01); *B60W 10/06* (2013.01); *B60W 10/26* (2013.01); *B60W 30/18072* (2013.01); *B60W 30/192* (2013.01); *B60W 50/023* (2013.01); *B60L 2260/24* (2013.01); *Y02T 10/7005* (2013.01); *Y02T 10/7077* (2013.01)

USPC ........................................................ 701/113

(58) Field of Classification Search

USPC ......... 701/113, 102, 115, 36, 1, 2; 123/179.3; 307/11, 43

See application file for complete search history.

(56) References Cited

U.S. PATENT DOCUMENTS 7,343,509 B2 *   3/2008   Sayama et al. .................. 701/36

FOREIGN PATENT DOCUMENTS

| DE | 10033317 A | 1/2002 |
|---|---|---|
| JP | 2010036718 | 2/2010 |

(Continued)

OTHER PUBLICATIONS

Japanese Application No. 2011-117060; Reasons for Rejection (English Translation).

(Continued)

*Primary Examiner* — Hieu T Vo (74) *Attorney, Agent, or Firm* — Frommer Lawrence & Haug LLP; Ronald R. Santucci (57) ABSTRACT

An automotive electrical system for a motor vehicle comprising an internal combustion engine, the automotive electrical system comprising a main electrical power source, a secondary electrical power source, safety critical electrical loads and non-safety critical electrical loads, and an electrical switching device arranged between the main and secondary electrical power sources and at least the safety critical electrical loads and configured to selectively connect at least the safety critical electrical loads to at least one of the main and secondary electrical power sources. The electrical switching device is configured to connect at least the safety critical electrical loads to the auxiliary electrical power source during the cranking of the internal combustion engine and/or when the motor vehicle is coasting with the internal combustion engine off and the main electrical power source is faulty.

17 Claims, 4 Drawing Sheets

(56) References Cited

FOREIGN PATENT DOCUMENTS

| WO | 2008302822 | 12/2008 |
| WO | 2009171779 | 7/2009 |

OTHER PUBLICATIONS

European Search Report issued for priority application 10425176 dated Sep. 13, 2010.

\* cited by examiner

AUTOMOTIVE ELECTRICAL SYSTEM OPERATION MANAGEMENT DURING COASTING AND WITH ENGINE OFF

TECHNICAL FIELD OF THE INVENTION

The present invention relates to an automotive dual battery electrical system operation management during coasting (or freewheeling) and with engine off.

STATE OF THE ART

In order to reduce fuel consumption and pollutant emissions of motor vehicles in urban traffic conditions, automotive manufacturers are gradually introducing in the motor vehicles so-called "Stop & Start" systems that turn the internal combustion engine off when the motor vehicle is about to stop and there is no request for traction power, and in particular when the speed of the motor vehicle falls below a given minimum speed, which is currently between 0 km/h and 10 km/h, depending on the automotive manufacturer, and the gearbox is in neutral.

The electrically powered/driven on-vehicle systems that are essential for the correct operation of the motor vehicle when the internal combustion engine is temporarily off, and which, for this reason, are commonly referred to as safety critical systems, are electrically powered by the motor vehicle's battery, which is however only capable of supplying sufficient voltage to ensure their correct operation for a certain length of time, after which the internal combustion engine must be restarted to activate the electrical power generating device/devices (alternator).

With the aim of achieving a further reduction in fuel consumption and pollutant emissions of motor vehicles, EP 1,491,788 and EP 1,620,639 in the name of the Applicant propose extending the functions of the Stop & Start system in motor vehicles provided with an automatic or automated servo-controlled transmission so that, in certain conditions, the motor vehicle is capable of coasting with the engine off. In particular, according to the above-mentioned patents, the internal combustion engine is turned off and the clutch is disengaged whenever the accelerator pedal is released or is not pressed for more than a given length of time, while the motor vehicle is travelling at less than a given speed, which is higher than that used in the Start & Stop systems, 80 Km/h in the example provided in said patents, and the internal combustion engine is cranked and the clutch engaged as soon as the accelerator pedal is pressed (again).

OBJECT AND SUMMARY OF THE INVENTION

The Applicant has performed a detailed study aimed at defining a solution so that when the motor vehicle leaves the coasting mode with the engine off this does not undermine the safety and operation of the on-vehicle systems.

In particular, the study performed by the Applicant was aimed at defining a solution specifically capable of achieving the following objectives:
- to prevent voltage drops in the electrical power supply to the electrically powered/driven on-vehicle systems such as the lighting system and safety critical systems upon leaving the coasting condition with the engine off;
- to guarantee the electrical power supply to the electrically powered/driven safety critical on-vehicle systems for the entire duration of coasting with the engine off even in the event of a battery fault; and
- to guarantee inertial cranking of the internal combustion engine even in the event of a battery fault.

The object of the present invention is thus to provide a solution that achieves the above-listed aims.

This objective is achieved by the present invention, which relates to an automotive electrical system as defined in the appended claims.

DETAILED DESCRIPTION OF PREFERRED EMBODIMENTS OF THE INVENTION

The present invention will now be described with reference to the accompanying drawings in sufficient detail for those skilled in the art to produce and use it. Persons skilled in the art will be able to implement various modifications to the embodiments described herein and the general principles disclosed herein could be applied to other embodiments and applications without departing from the scope of the present invention, as defined in the appended claims. Accordingly, the present invent is not to be limited in scope to the embodiments described and shown herein, but is to be accorded with the widest scope consistent with the principles and characteristics disclosed and claimed herein.

Figure 1:
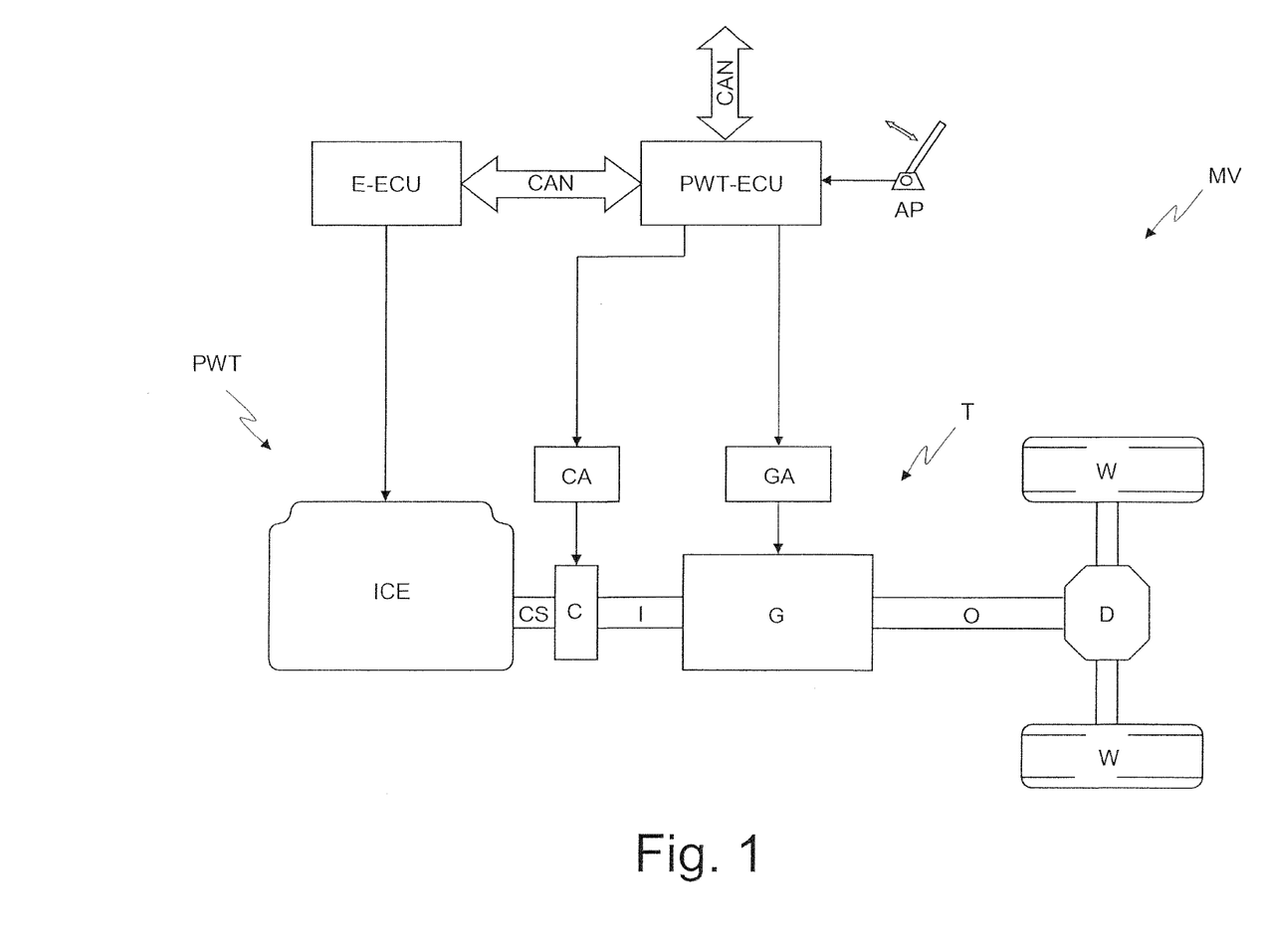
FIG. 1 is a block diagram of an automotive powertrain.

FIG. 1 shows, as a non-limiting example, a block diagram of a powertrain PWT of a motor vehicle MV. The powertrain PWT comprises an internal combustion engine ICE, with a drive shaft CS which is coupled to a transmission T via a clutch C. The transmission T comprises a discrete ratio gearbox G, of the meshing gear type, with an input shaft I which may be coupled to the drive shaft CS via the clutch C and an output shaft coupled to a pair of driving wheels W via a differential D of a known type.

The clutch C is servo-controllable by means of an associated electrically or electro-hydraulically controlled actuator device CA. The gearbox G is also servo-controllable by means of a plurality of electrically or electro-hydraulically controlled actuator devices, generally indicated by GA, which can be operated to engage and disengage the gears corresponding to the various speed ratios that can be achieved.

The internal combustion engine ICE is controlled by an electronic control unit E-ECU which is known per se and which is thus not described in detail, while the powertrain PWT is controlled by an electronic control unit PWT-ECU connected to the electronic control unit E-ECU of the internal combustion engine ICE, and to the actuator devices CA and GA associated with the clutch C and gearbox G, and is programmed to cause the internal combustion engine ICE to be turned off, via the electronic control unit E-ECU, and either the disengagement of the clutch C, leaving the currently selected speed ratio in place, or the selection of the neutral gear in the gearbox G, by means of the actuator devices CA and GA, whenever the accelerator pedal AP of the motor vehicle MV is released or is not pressed for more than a given length of time, while the travelling speed of the motor vehicle MV is below a given travelling speed threshold, and the cranking of the internal combustion engine ICE, again via the electronic control unit E-ECU, and the engagement of the clutch C, again via the actuator devices CA and GA, as soon as the accelerator pedal AP is pressed.

In a different embodiment, the electronic control unit E-ECU of the internal combustion engine ICE and the electronic control unit PWT-ECU of the powertrain PWT may be integrated in a single electronic control unit ECU.

The aforementioned study performed by the Applicant aimed at defining a solution so that when the motor vehicle leaves the coasting mode with the engine off this does not undermine the safety and operation of the on-vehicle systems revealed firstly the need to use an automotive dual battery electrical system, in which a auxiliary battery is used in addition to the main battery. In conventional dual battery electrical systems the second battery is normally used if a fault occurs in the main battery and/or to electrically supply loads that are not regarded as priority loads or safety critical loads, in order to reduce the electrical load to be supplied electrically by the main battery. The study also revealed that, given the need to re-start the engine by means of inertial cranking instead of battery cranking in the event of a main battery fault, the auxiliary battery could have a smaller capacity than the main battery, and thus be smaller in size and less expensive than the main battery.

Figure 2:
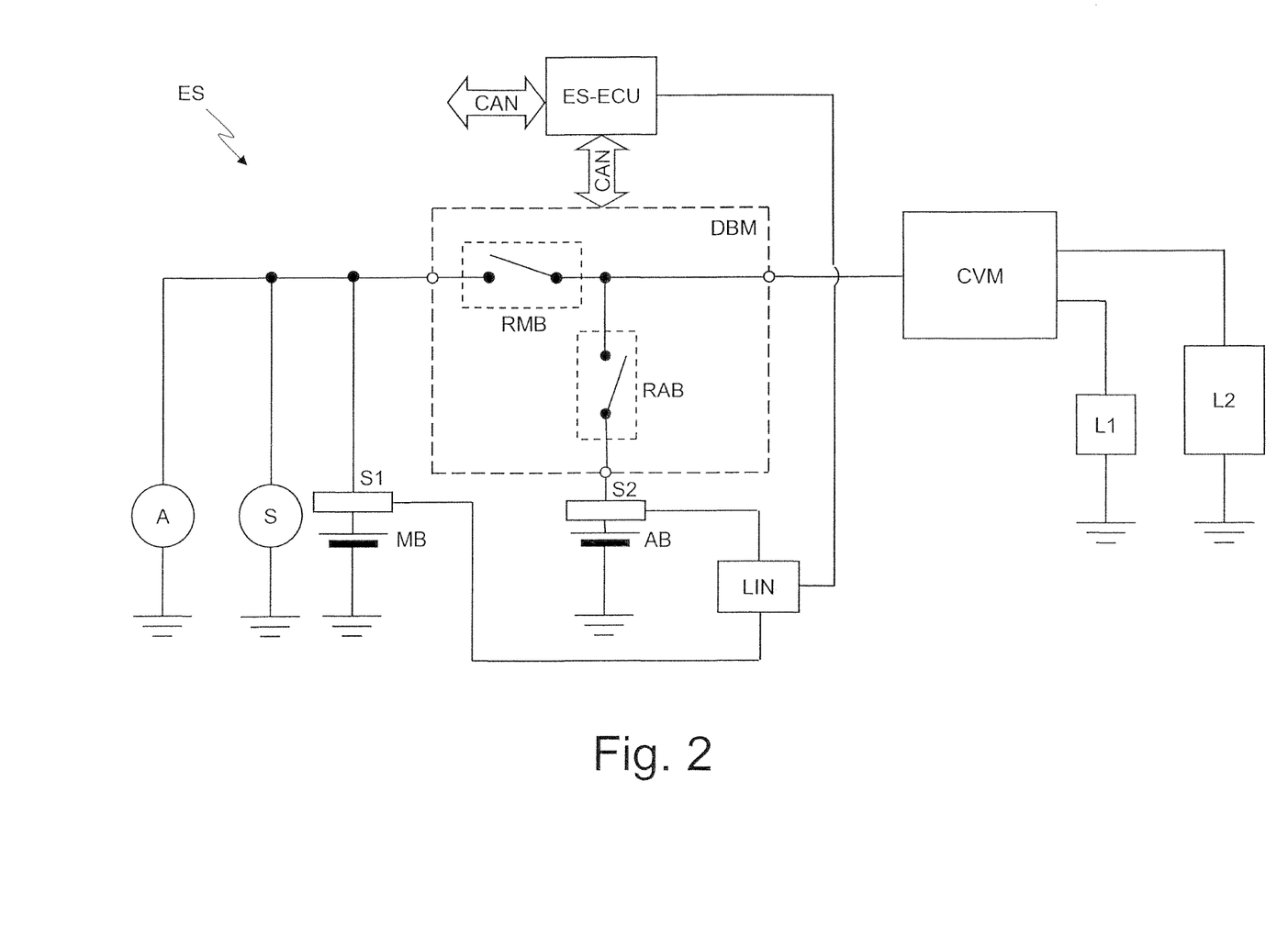
FIGS. 2 and 3 are simplified electrical diagrams of two different architectures of an automotive electrical system.
Figure 3:
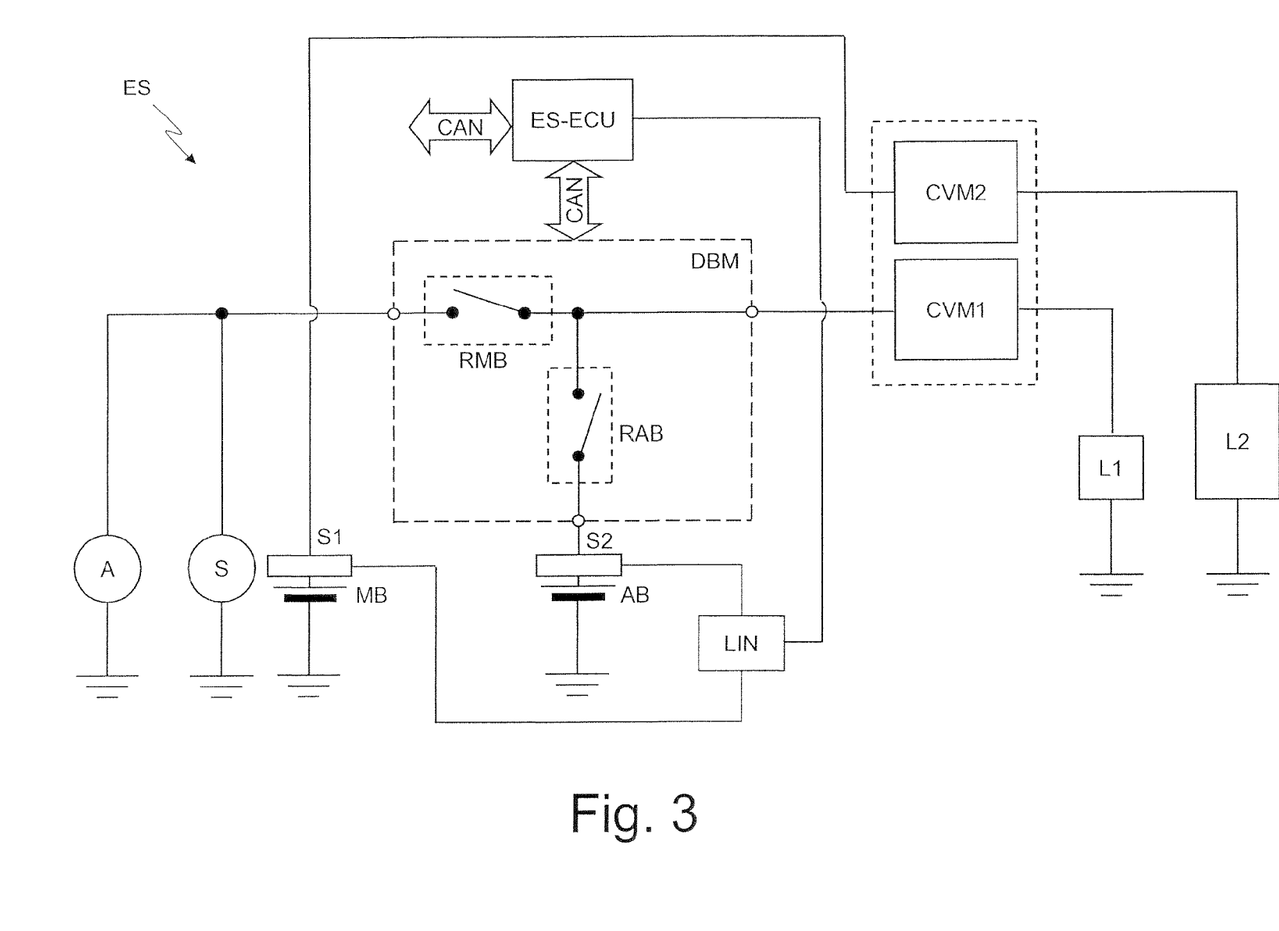

In particular, with regard to the automotive dual battery electrical system, the study performed by the Applicant resulted in the definition of two different circuit architectures, the electrical diagrams of which are shown in FIGS. 2 and 3, in which the same reference numbers have been used to indicate the same electrical components in the two diagrams.

In detail, in FIGS. 2 and 3, the automotive dual battery electrical system is referenced as a whole by ES and comprises a main battery MB, a auxiliary battery AB, an alternator A, a starter motor S, an electronic control unit ES-ECU that communicates with the Controller Area Network (CAN) of the motor vehicle MV, a switching unit, hereinafter referred to as a dual battery manager DBM, an engine electrical power distribution unit CVM, and electrical loads L1 and L2, which as a whole represent all the electrically powered/driven on-vehicle systems of the motor vehicle MV, both the safety critical systems and, respectively, the non-safety critical systems.

The electronic control unit ES-ECU of the electrical system ES could alternatively be an electronic control unit specifically dedicated to controlling the electrical system ES and thus be separate from the electronic control unit PWT-ECU of the powertrain PWT and of the electronic control unit E-ECU of the internal combustion engine ICE and communicate with the latter via the CAN, or it could be integrated with the electronic control unit PWT-ECU of the powertrain PWT and with the electronic control unit E-ECU of the internal combustion engine ICE in a single electronic control unit ECU.

FIGS. 2 and 3 also show two battery electrical charge state sensors referenced by S1 and S2, associated respectively with the main battery MB and with the auxiliary battery AB to determine their electrical charge states and connected to the electronic control unit ES-ECU via a Local Interconnect Network (LIN).

The alternator A and the starter motor S are connected directly to the main battery MB, i.e. without the interposition of other components, and also indirectly to the auxiliary battery AB via the dual battery manager DBM.

The dual battery manager DBM communicates with the electronic control unit ES-ECU via the CAN and essentially comprises a first input connected to the main battery MB, a second input connected to the auxiliary battery AB, and an output connected to the engine electrical power distribution unit CVM.

The dual battery manager DBM essentially comprises first and second electrically controllable switching devices RMB and RAB, which may consist of relays or solid state devices, and may optionally also comprise a suitably programmed micro-controller.

The operational state (open or closed) of the electrically controllable switching devices RMB and RAB can either be controlled remotely by the electronic control unit ES-ECU, via the CAN, when the dual battery manager DBM does not comprise a micro-controller, or locally by the micro-controller of the dual battery manager DBM, in both cases based on information supplied by the battery electrical charge state sensors S1 and S2 and information about the motor vehicle state supplied via the CAN.

The first electrically controllable switching device RMB is connected between the first input and the output, so resulting connected between the main battery MB and the engine electrical power distribution unit CVM, while the second electrically controllable, switching device RAB is connected between the second input and the output, so resulting connected between the auxiliary battery AB and the engine electrical power distribution unit CVM.

The dual battery manager DBM is also configured to control the electrically controllable switching devices RMB and RAB in response to command signals from the electronic control unit ES-ECU via the CAN, to perform a self-diagnosis to detect any malfunctions and implement specific switching strategies for the electrically controllable switching devices RMB and RAB based on the detected malfunction. These strategies are not described in detail herein as they do not form part of the present invention. Here it suffices to point out that if a fault in the dual battery manager DBM is detected when the engine is running, the automatic turning off of the engine when the motor vehicle is travelling is disabled.

The engine electrical power distribution unit CVM can assume two different circuit architectures, which are shown in FIGS. 2 and 3. In particular, according to the architecture shown in FIG. 2, the engine electrical power distribution unit CVM controls both the safety critical electrical loads L1 and the non-safety critical electrical loads L2. According to the architecture shown in FIG. 3, the engine electrical power distribution unit CVM comprises two separate electrical power distribution modules: one, referenced by CVM2, connected between the main battery MB and the non-safety critical loads L2, so as to electrically power the latter by means of the main battery MB only, and the other, referenced by CMV1, connected between the output of the dual battery manager DBM and the safety critical electrical loads L1, so as to electrically power the latter selectively either via the main battery MB or via the auxiliary battery AB, depending on the operational status (open/closed) of the first and of the second electrically controllable switching device RMB and RAB. This architecture allows the use of a auxiliary battery AB with a smaller electrical power capacity, which is thus also smaller in size and simpler to install.

As regards the distinction between the electrical loads as described above, the safety critical electrical loads are the power-assisted steering, the braking system and associated sub-systems, such as ABS (Antilock Braking System) and ESP (Electronic Stability Program), the lighting system, windscreen wipers, etc., while non-safety critical loads include the infotainment system, comprising, among others, the Hi-Fi, the air-conditioning system, etc.

The study performed by the Applicant aimed at defining a solution so that when the motor vehicle leaves the coasting mode with the engine off this does not undermine the safety and operation of the on-vehicle systems then led to the definition of an operation management logic for the dual battery electrical system shown in FIGS. 2 and 3, enabling the Applicant to achieve all the aforementioned objectives.

Figure 4:
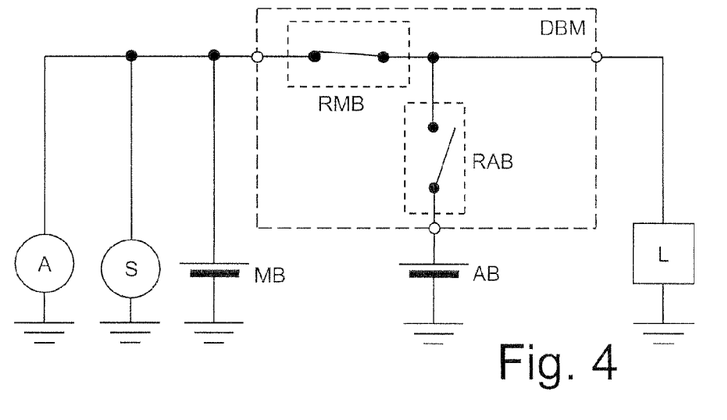
FIGS. 4 to 6 are simplified electrical diagrams of an automotive electrical system during different operating conditions thereof.
Figure 5:
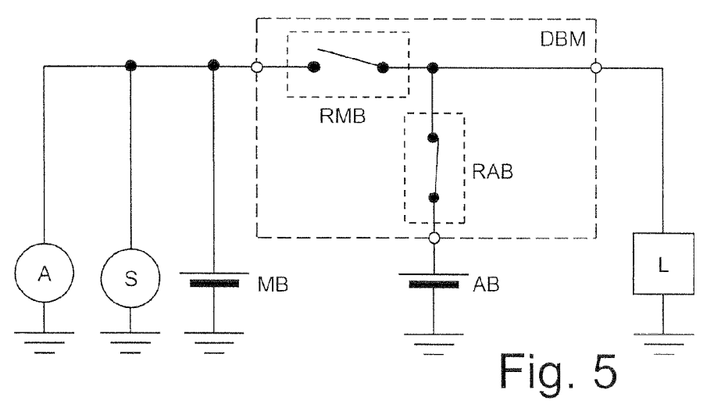
Figure 6:
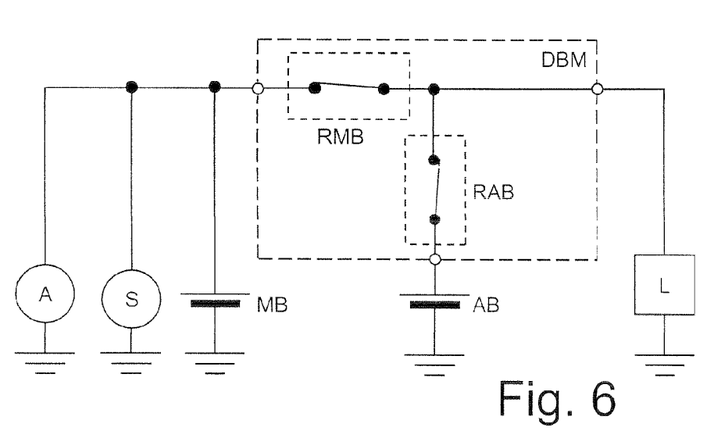

The operation management logic for the dual battery electrical system will now be described with reference to the various possible operational conditions of the electrical system, which are schematically shown in FIGS. 4-6. Purely for the purpose of including both circuit architectures, the engine electrical power distribution unit CMV shown in FIGS. 2 and 3 is not shown in FIGS. 4-6 and the electrical loads, indicated as a whole by L, are illustrated directly connected to the dual battery manager DBM. For the sake of simplicity, the two battery electrical charge state sensors S1 and S2 are not shown in FIGS. 4-6.

1. Key OFF

The term "Key OFF" refers both to the case in which the ignition key has been removed from the ignition lock cylinder and to the case in which the ignition key is inserted in the ignition lock cylinder and set to the "off" position.

In the "key OFF" condition, the electrical system ES is caused to assume the operational condition shown in FIG. 4, in which all the electrical loads L that require electrical power are electrically powered by the main battery MB, in exactly the same way as a motor vehicle that is not provided with a auxiliary battery. The auxiliary battery AB can thus have a reduced electrical design capacity since it is not required to electrically power any electrical load L.

To reach the operational condition shown in FIG. 4, the electronic control unit ES-ECU first informs the dual battery manager DBM, via the CAN, of the "key OFF" condition, and the dual battery manager DEN then causes the first electrically controllable switching device RMB to close and the second electrically controllable switching device RAB to open.

In a different embodiment, the operational condition shown in FIG. 4 is achieved more simply by providing two electrically controllable switching devices RMB and RAB with rest states (i.e. their condition when not powered) that are normally closed and, respectively, normally open. In this way, they do not have to be controlled by the electronic control unit ES-ECU and no data has to be exchanged via the CAN. All that is required is an electrical power distribution system which, in the "key OFF" condition, disconnects the electrical power supply to the two electrically controllable switching devices RMB and RAB, or to the dual battery manager DBM. This embodiment avoids the need to supply electrical power to the dual battery manager DBM in the "key OFF" condition, so as not to increase the electrical load on the main battery MB in this condition.

2. ICE Cranking

During cranking of the internal combustion engine ICE, the electrical system ES is caused to assume the operational condition shown in FIG. 5. To reach this operational condition, the electronic control unit ES-ECU informs the dual battery manager DBM, via the CAN, of a request to crank the engine made by the driver by turning the ignition key, after which the dual battery manager DBM first causes the first electrically controllable switching device RMB to open and then the second electrically controllable switching device RAM to close. In this way, the main battery MB only supplies electrical power to the starter motor S, while the electrical loads that require electrical power in this operational condition are electrically powered by the auxiliary battery AB. There is thus no voltage drop in the power supply to the electrical loads during the cranking of the internal combustion engine.

Once the first and second electrically controllable switching devices RMB and RAB have been operated, the dual battery manager DBM informs the electronic control unit ES-ECU, via the CAN, that the cranking of the internal combustion engine ICE can be enabled.

3. ICE ON

When the internal combustion engine ICE has been cranked ("ICE ON"), the electrical system ES is caused to assume the operational condition shown in FIG. 4. To reach said operational condition, the electronic control unit ES-ECU first informs the dual battery manager DBM, via the CAN, that the internal combustion engine ICE has been cranked, after which the dual battery manager DBM causes the first electrically controllable switching device RMB to close and the second electrically controllable switching device RAB to open. In this way, all the electrical loads L that require electrical power in this operational condition are electrically powered by the main battery MB and by the alternator A.

4. ICE ON and Auxiliary Battery Re-Charging

When the internal combustion engine ICE is ON and the auxiliary battery AB needs re-charging, the electrical system ES is caused to assume the operational condition shown in FIG. 6. To reach this operational condition, the electronic control unit ES-ECU recognizes the need to re-charge the auxiliary battery AB based on information, such as the voltage or current supplied by the auxiliary battery AB, from the battery electrical charge state sensor S2 associated with the auxiliary battery AB, and subsequently informs the dual battery manager DBM, via the CAN network, accordingly, so that the dual battery manager DBM can cause the first and the second electrically controllable switching devices RMB and RAB to close. In this way, the auxiliary battery AB and all the electrical loads L that require electrical power in this operational condition are electrically powered by the main battery MB and by the alternator A.

In an alternative embodiment, the dual battery manager DBM autonomously recognizes that the auxiliary battery AB needs re-charging based on external information, such as the electrical charge state of the auxiliary battery AB, provided by the electronic control unit ES-ECU, via the CAN, and/or internal information, such as the voltage or current supplied by the auxiliary battery AB, provided by the battery electrical charge state sensor S2 associated with the auxiliary battery AB.

5. ICE OFF and Motor Vehicle Coasting

In order for the motor vehicle MV to travel with the internal combustion engine ICE turned off, no motion must be transmitted between the wheels W and the internal combustion engine ICE and hence the former must therefore be disconnected from the latter, otherwise this would restart due to inertia. This condition can be achieved either by disengaging the clutch C and leaving the currently selected gear speed ratio in place, or by placing the gearbox G in neutral. As described previously, this operational condition of the motor vehicle MV is caused by the electronic control unit PWT-ECU, which is programmed to turn the internal combustion engine ICE off, by means of the electronic control unit E-ECU, and to disengage the clutch C or place the gearbox G in neutral whenever the accelerator pedal AP is released or is not pressed for more than a given length of time, while the travelling speed of the motor vehicle MV is below a given travelling speed threshold.

With the motor vehicle MV coasting and the internal combustion engine ICE off, the electrical system ES is caused to assume the operational condition shown in FIG. 4, which is exactly the same as when the motor vehicle MV is travelling with the internal combustion engine ICE on. To reach this operational condition, the electronic control unit ES-ECU first informs the dual battery manager DBM, via the CAN, that the motor vehicle MV is travelling with the internal combustion engine ICE off, after which the dual battery manager DBN causes the first electrically controllable switching device RMB to close and the second electrically controllable switching device RAB to open. Thus, all the electrical loads L that require electrical power while the motor vehicle MV is travelling with the internal combustion engine ICE off are electrically powered by the main battery MB.

6. ICE OFF, Motor Vehicle Travelling and Main Battery Fault

If a fault occurs in the main battery MB while the motor vehicle MV is travelling with the internal combustion engine ICE off, for example if the main battery MB becomes an open circuit or a short circuit so that the voltage on the first input of the dual battery manager DBM is zero, the electrical system ES is caused to assume the operational condition shown in FIG. 5. To reach this operational condition, the electronic control unit ES-ECU recognizes the presence of a fault in the main battery MB based on information, such as the voltage or the current supplied by the main battery MB, provided by the battery electrical charge state sensor S1 associated with the main battery MB and informs the dual battery manager DBM accordingly, via the CAN network, so that the dual battery manager DBM causes the first electrically controllable switching device RMB to open and the second electrically controllable switching device RAB to close. Thus, all the electrical loads L that require electrical power while the motor vehicle MV is travelling with the internal combustion engine ICE off are electrically powered by the auxiliary battery AB. This, on the one hand, guarantees the electrical power supply to the electrically powered/controlled safety critical on-vehicle systems for the entire duration of coasting with the engine off even in the case of a battery fault and, on the other, guarantees inertial cranking of the internal combustion engine ICE even in the case of a battery fault. In the latter safety critical condition, the auxiliary battery AB supplies electrical power to the actuator devices CA and GA associated with the clutch C and with the gearbox G, by means of which the clutch C can be engaged and, if necessary, a gear speed ratio can be engaged, thus causing the inertial cranking of the internal combustion engine.

In an alternative embodiment, the dual battery manager DBM autonomously recognizes a fault in the main battery MB based on information, such as the voltage or the current supplied by the auxiliary battery AB, provided by the battery electrical charge state sensor S1 associated with the main battery MB.

7. Auxiliary Battery Fault

If a fault occurs in the auxiliary battery AB, for example if the battery becomes an open circuit or a short circuit so that the voltage on the second input of the dual battery manager DBM is zero, the electrical system ES is caused to assume the operational condition shown in FIG. 4. To reach this operational condition, the electronic control unit ES-ECU recognizes the presence of a fault in the auxiliary battery AB based on information, such as the voltage or the current supplied by the auxiliary battery AB, provided by the battery electrical charge state sensor S2 associated with the auxiliary battery AB and informs the dual battery manager DBM accordingly, via the CAN network, so that the dual battery manager DBM can cause the second electrically controllable switching device RAB to open. If the auxiliary battery AB fault occurs when the first electrically controllable switching device RMB is open, before opening the second electrically controllable switching device RAB, the dual battery manager DBM causes the first electrically controllable switching device RMB to close. Thus, all the electrical loads L that require electrical power while the motor vehicle MV is travelling with the internal combustion engine ICE off are electrically powered by the main battery MB.

In an alternative embodiment, the dual battery manager DBM autonomously recognizes a fault in the auxiliary battery MB based on information, such as the voltage or the current supplied by the auxiliary battery AB provided by the battery electrical charge state sensor S2 associated with the auxiliary battery AB.

As may be appreciated from the above description, the first electrically controllable switching device RMB is normally closed, it remains closed during "key off", when the internal combustion engine ICE is on or when the internal combustion engine ICE is off and the motor vehicle MV is travelling, and is opened during the cranking of the internal combustion engine ICE and when a fault occurs in the main battery MB with the internal combustion engine ICE off and the motor vehicle MV travelling.

The second electrically controllable switching device RAB is normally open and is closed during the cranking of the internal combustion engine ICE, when the auxiliary battery AB needs re-charging and when a fault Occurs in the main battery MB with the internal combustion engine ICE off and the motor vehicle MV travelling.

The advantages of the present invention are apparent from the above description. In particular, when the vehicle leaves the coasting mode with the engine off this does not undermine the safety or operation of the vehicle systems and more specifically this solution prevents voltage drops in the power supply to the electrically powered/driven vehicle systems upon changing from the coasting condition with the engine off, it guarantees the electrical power supply to the electrically powered/driven safety critical vehicle systems for the entire duration of coasting with the engine off even in the event of a battery fault and it guarantees inertial cranking of the internal combustion engine even in the event of a battery fault.

Lastly, it is clear that modifications and variations may be made to that described and illustrated herein without departing from the scope of the present invention, as set forth in the claims.

For example, the auxiliary battery AB could be replaced by an electrical power source comprising a kinetic energy recovery system and a DC/DC converter operable to convert the electrical power generated by the kinetic energy recovery system into a form that can be used by the electrically powered/driven on-vehicle systems.

Moreover, instead of determining the electrical charge states of the main and secondary batteries MB, AB based on the measures supplied by the battery electrical charge state sensors S1 and S2, the electronic control unit ES-ECU could determine this condition based on a mathematical model implemented by said electronic control unit ES-ECU and based on the electrical characteristics of the batteries such as voltage and current supplied.

Moreover, the method of managing the clutch C and the gearbox G when the motor vehicle MV is travelling and the internal combustion engine ICE is off could be different to that described above and in the above-mentioned patents in the name of the Applicant. For example, when the clutch C is disengaged to allow the internal combustion engine ICE to be turned off, the current gear speed ratio could remain in place or could be disengaged to place the gearbox G in neutral. When the gearbox G is in neutral, the clutch C could be re-engaged or could conveniently remain disengaged, so as to reduce the pulling force of the wheels W. Alternatively, when the clutch C is disengaged to allow the internal combustion engine ICE to be turned off, the current gear speed ratio could be disengaged and a different speed ratio engaged that, taking into account the gradual slowing down of the motor vehicle MV while travelling with the internal combustion engine ICE off, could conveniently be the second gear.

The invention claimed is:

1. An automotive electrical system (ES) for a motor vehicle (MV) comprising an internal combustion engine (ICE), the automotive electrical system (ES) comprising a main electrical power source (MB), an auxiliary electrical power source (AB), safety critical electrical loads (L1) and non-safety critical electrical loads (L2), and an electrical switching device (DBM) arranged between the main and auxiliary electrical power sources (MB, AB) and at least the safety critical electrical loads (L1) and configured to selectively connect at least the safety critical electrical loads (L1) to at least one of the main and auxiliary electrical power sources (MB, AB); wherein the electrical switching device (DBM) is configured to connect at least the safety critical electrical loads (L1) to the auxiliary electrical power source (AB) during cranking of the internal combustion engine (ICE) and/or when the motor vehicle (MV) is coasting with the internal combustion engine (ICE) off and the main electrical power source (MB) is faulty.

2. The automotive electrical system (ES) of claim 1, wherein the electrical switching device (DBM) is further configured to connect the auxiliary electrical power source (AB) to the main electrical power source (MB) when the internal combustion engine (ICE) is on and the auxiliary electrical power source (AB) needs to be electrically re-charged.

3. The automotive electrical system (ES) of claim 1, wherein the electrical switching device (DBM) comprises a first electrically controllable switching device (RMB) connected between the main electrical power source (MB) and at least the safety critical electrical loads (L1), and a second electrically controllable switching device (RAB) connected between the auxiliary electrical power source (AB) and at least the safety critical electrical loads (L1).

4. The automotive electrical system (ES) of claim 3, wherein the electrical switching device (DBM) is further configured to cause the first electrically controllable switching device (RMB) to open and the second electrically controllable switching device (RAB) to close during the cranking of the internal combustion engine (ICE) and/or when the motor vehicle (MV) is coasting with the internal combustion engine (ICE) turned off and when the main electrical power source (MB) is faulty.

5. The automotive electrical system (ES) of claim 4, wherein the electrical switching device (DBM) is further configured to cause both the first and the second electrically controllable switching devices (RMB, RMA) to close when the internal combustion engine (ICE) is on and the auxiliary electrical power source (AB) needs to be electrically re-charged.

6. The automotive electrical system (ES) of claim 1, wherein the electrical switching device (DBM) is further configured to detect a fault in the main electrical power source (MB) and when the auxiliary electrical power source (AB) needs to be electrically re-charged.

7. The automotive electrical system (ES) of claim 1, wherein the electrical switching device (DBM) is further configured to perform a self-diagnosis to detect any malfunctioning thereof, so as to prevent the internal combustion engine (ICE) from being turned off when a malfunction is detected.

8. The automotive electrical system (ES) of claim 1, further comprising an electronic control unit (ES-ECU) connected to the electrical switching device (DBM) and configured to cause the electrical switching device (DBM) to become configured as claimed in claim 1.

9. The automotive electrical system (ES) of claim 8, wherein the electronic control unit (ES-ECU) is configured to inform the electrical switching device (DBM) that the motor vehicle (MV) is coasting with the internal combustion engine (ICE) off and that cranking of the internal combustion engine (ICE) has been requested.

10. The automotive electrical system (ES) of claim 9, wherein the electronic control unit (ES-ECU) is further configured to detect and inform the electrical switching device (DBM) of a fault in the main electrical power source (MB) and when the auxiliary electrical power source (AB) needs to be electrically re-charged.

11. The automotive electrical system (ES) of claim 8, further comprising a Controller Area Network, and wherein the electronic control unit (ES-ECU) and the electrical switching device (DBM) are configured to exchange data via the Controller Area Network.

12. An automotive electronic control unit (ES-ECU) for an automotive electrical system (ES) for a motor vehicle (MV) comprising an internal combustion engine (ICE), the automotive electrical system (ES) comprising a main electrical power source (MB), an auxiliary electrical power source (AB), safety critical electrical loads (L1) and non-safety critical electrical loads (L2), and an electrical switching device (DBM) arranged between the main and auxiliai electrical power sources (MB, AB) and at least the safety critical electrical loads (L1) and configured to selectively connect at least the safety critical electrical loads (L1) to at least one of the main and auxiliary electrical power sources (MB, AB); wherein the electronic control unit (ES-ECU) is connected to the electrical switching device (DBM) and configured to cause the electrical switching device (DBM) to become configured to connect at least the safety critical electrical loads (L1) to the auxiliary electrical power source (AB) during cranking of the internal combustion engine (ICE) and/or when the motor vehicle (MV) is coasting with the internal combustion (ICE) off and the main electrical power source faulty.

13. A software program loadable in an automotive electronic control unit (ES-ECU) and designed to cause, when run, the automotive electronic control unit (ECU) to become configured as claimed in claim 8.

14. The automotive electrical system (ES) of claim 1, further comprising an electrical power distribution unit (CVM) arranged between the electrical switching device (DBM) and the safety critical and non-safety critical electrical loads (L1, L2) to supply electrical power thereto.

15. The automotive electrical system (ES) of claim 1, further comprising an electrical power distribution unit (CVM) connected so as to cause the non-safety critical electrical loads (L2) to be electrically powered directly by the main electrical power source (MB) only and the safety critical electrical loads (L1) to be selectively electrically powered by either the main electrical power source (MB) or by the auxiliary switching device (DBM).

16. A motor vehicle (MV) comprising an electrical system (ES) according to claim 1.

17. An automotive electrical switching device (DBM) for an automotive electrical system (ES) for a motor vehicle (MV) comprising an internal combustion engine (ICE), the automotive electrical system (ES) comprising a main electrical power source (MB), an auxiliary electrical power source (AB), safety critical electrical loads (L1) and non-safety critical electrical loads (L2), and an electrical switching device (DBM) arranged between the main and auxiliary electrical power sources (MB, AB) and at least the safety critical electrical loads (L1) and configured to selectively connect at least the safety critical electrical loads (L1) to at least one of the main and auxiliary electrical power sources (MB, AB); wherein the electrical switching device (DBM) is confingured to connect at least the safety critical electrical loads (L1) to the auxiliary electrical power source (AB) during cranking of the internal combustion engine (ICE) and/or when the motor vehicle (MV) is coasting with the internal combustion (ICE) off and the main electrical power source faulty.

* * * * *